Nov. 27, 1923.

R. J. HAMMOND 1,475,487

ADJUSTABLE CLAMP FOR RUBBER PIPES AND THE LIKE

Filed Sept. 12, 1922

Inventor
Robert James Hammond
per Seward Davis
Attorney

Patented Nov. 27, 1923.

1,475,487

UNITED STATES PATENT OFFICE.

ROBERT J. HAMMOND, OF LONDON, ENGLAND.

ADJUSTABLE CLAMP FOR RUBBER PIPES AND THE LIKE.

Application filed September 12, 1922. Serial No. 587,718.

*To all whom it may concern:*

Be it known that I, ROBERT JAMES HAMMOND, a subject of the King of Great Britain and Ireland, residing at London, in the county of London, England, have invented new and useful Improvements in or Relating to Adjustable Clamps for Rubber Pipes and the like, for which I have filed an application in Great Britain on the 5th May, 1922, of which the following is a specification.

This invention relates to adjustable clips for india-rubber and like pipes and india-rubber and like flexibly covered electric conductors, cables and the like.

The primary object of the invention is to improve the means for clamping flexible pipes on to their connections.

A further object is to improve the means for clamping flexibly covered electric conductors and the like.

A still further object is to facilitate the fixing and removal of the said clips.

Yet another object is to enable the said clips to be attached to a wall or the like so as to fix the said pipes or conductors in position.

Another object is to provide a clip which gives a powerful distributed pressure over the surface of the flexible pipe or covering.

Other objects will be set forth in the body of the specification.

According to this invention, a clip for india-rubber and like resilient pipes or flexibly covered electric conductors, or cables is provided with a loop member adapted to be placed around the pipe whilst a bridge piece, which carries a member for engaging the pipe, is provided with heads adapted to engage the ends of the loop so as to prevent disengagement when the clip is in the operating position. The loop member is preferably formed as a U shaped band and is slightly flexible with holes in the ends and the sides of the said holes converge towards the end, or are formed in the shape of a key-hole with the narrow portion towards the ends to permit the enlarged heads on the bridge piece to be passed through the wide portion of the said holes and, when slipped up into the narrow portion to prevent the disengagement of the bridge piece from the band. The loop member may be formed as a double wire loop adapted to engage the ends of the bridge piece, or it may be formed as a single wire loop having the ends formed with eyes.

A practical example of construction according to the invention is described with reference to the accompanying figures wherein:—

Figure 1:
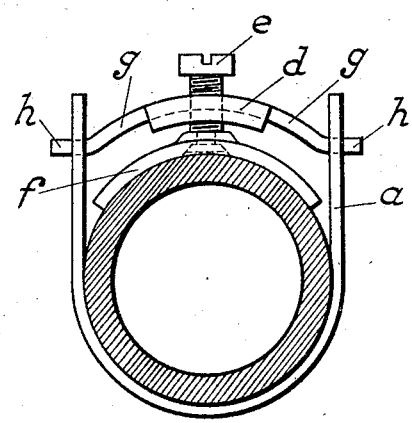

Figure 1. is an end view showing the clip in position on a flexible pipe.

Figure 2:
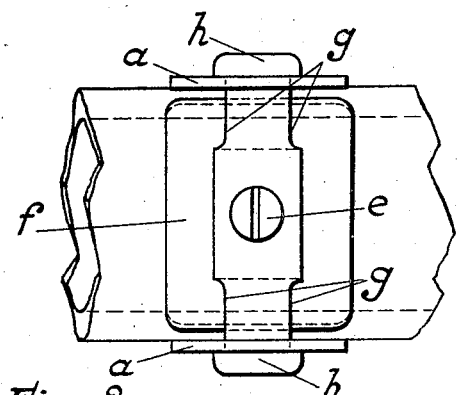

Figure 2. is a plan of Figure 1.

Figure 3:
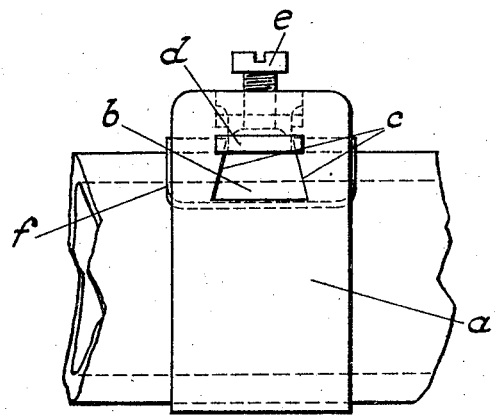

Figure 3. is a side view of Figure 1.

Figure 4:
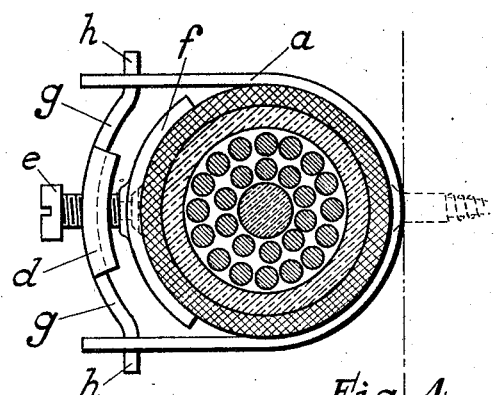

Figure 4. is an end view showing the clip in position on an electric insulated cable attached to a wall.

Figure 5:
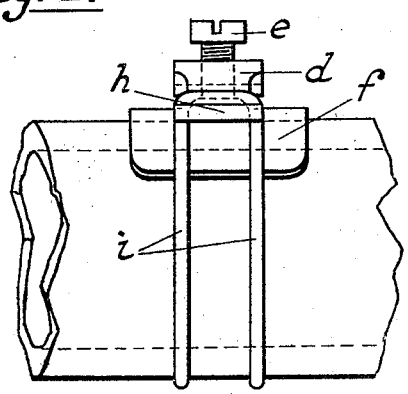

Figure 5. is a side elevation of a modified clip having a double wire loop.

A U shaped band or loop $a$ is formed of sheet metal and is provided with holes $b$ of truncated triangular shape with the sides $c$ converging towards the ends of the band $a$. The bridge piece $d$, provided with an adjustable centre screw $e$ to which the saddle piece $f$ is swivelly attached, is inserted in the said holes and is provided adjacent its ends with recesses $g$ to permit it being slid into the narrow portion of the said holes thus preventing disengagement from the sides of the bands when pressure is applied to the bridge piece. The recesses $g$ form in effect enlarged heads $h$ on the ends of the bridge piece.

The flexible pipe or hose is inserted in the U shaped band $a$ below the saddle piece $f$ so that the circumference of the pipe is almost entirely enclosed, and the pipe is securely clamped to its connection without possibility of leakage or distortion. A quick release of the clip may be obtained by a few turns of the central screw $e$ thus releasing the bridge piece $d$ which may then be pressed down on one side to the wide portion of one of the holes $b$ when the U shaped band may be disengaged from the bridge piece.

The U shaped band is preferably sufficiently flexible to permit the sides to spring inwards slightly and grip the pipe or hose on the side when pressure is applied to the saddle piece.

In the modification shown in Figure 4 the clip is shown applied to flexibly covered conductors to enable the conductors to be attached to a wall or the like, or to prevent the ends of the insulation from unravelling.

In the modification shown in Figure 5 the

U shaped member is formed as a double wire loop $i$, the ends of which are engaged by the ends of the bridge piece $d$.

What I claim is.

1. A clip for india-rubber and like pipes and covered cables and conductors comprising a U shaped band having a hole in each end with the outer ends of the said hole narrower than the inner end, a bridge piece, an enlarged head on each end of the said bridge piece adapted to pass through the wider portion of the corresponding hole in the band and when slipped up into the narrower portion to prevent disengagement of the bridge piece from the band, a screw threading through said bridge piece, and a saddle piece swivelly connected to said screw.

2. A clip for india-rubber and like pipes and covered cables and conductors comprising a U shaped band having a key-shaped hole in each end with the narrower portion of the said hole nearer the end of the band than the wider portion, a bridge piece, an enlarged head on each end of the said bridge piece adapted to pass through the wider portion of the corresponding hole in the band, a screw threading through said bridge piece, and a saddle piece swivelly connected to said screw.

3. A clip for india-rubber and like pipes and covered cables and conductors comprising a loop member having a hole in each end, a bridge piece, lateral extensions of said bridge piece for detachably engaging said holes, a screw threading through said bridge piece, and means for turning said screw, a saddle piece, a shoulder on said screw acting as a seating to said saddle piece and means for swivelly connecting the said saddle piece to said screw.

R. J. HAMMOND.

Witness:
A. G. THURSTON.